United States Patent
Bonitz (10) Patent No.: US 7,327,236 B2
(45) Date of Patent: Feb. 5, 2008

(54) METHOD AND DEVICE FOR RECOGNIZING A COLLISION

(75) Inventor: Jochen Bonitz, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 218 days.

(21) Appl. No.: 10/548,117

(22) PCT Filed: Feb. 17, 2004

(86) PCT No.: PCT/EP2004/001492

§ 371 (c)(1),
(2), (4) Date: Sep. 6, 2005

(87) PCT Pub. No.: WO2004/078531

PCT Pub. Date: Sep. 16, 2004

(65) Prior Publication Data

US 2006/0176161 A1  Aug. 10, 2006

(30) Foreign Application Priority Data

Mar. 3, 2003  (DE) ................. 103 09 227

(51) Int. Cl.
*B60Q 1/00* (2006.01)
*B60R 21/16* (2006.01)
(52) U.S. Cl. .................. 340/436; 280/735
(58) Field of Classification Search ............ 340/436; 701/47, 301; 280/735, 734, 728.1
See application file for complete search history.

(56) References Cited

U.S. PATENT DOCUMENTS

| | | | | |
|---|---|---|---|---|
| 5,379,221 A * | 1/1995 | Schulter et al. ......... 701/47 |
| 5,431,441 A * | 7/1995 | Okano ................. 280/735 |
| 5,790,404 A | 8/1998 | Faye et al. |
| 5,936,518 A * | 8/1999 | Fukui et al. ........... 340/436 |
| 6,816,767 B2 * | 11/2004 | Hayasaka et al. ........ 701/47 |
| 6,836,716 B2 * | 12/2004 | Roelleke et al. ........ 701/45 |
| 2003/0034194 A1 | 2/2003 | Roelleke et al. |
| 2003/0127271 A1 | 7/2003 | Hayasaka et al. |

FOREIGN PATENT DOCUMENTS

| | | |
|---|---|---|
| DE | 44 45 996 A1 | 6/1996 |
| DE | 196 44 975 A1 | 5/1997 |
| DE | 100 42 376 C1 | 10/2001 |
| EP | 1 323 592 A1 | 7/2003 |

* cited by examiner

*Primary Examiner*—Jeffery Hofsass
*Assistant Examiner*—Sigmund Tang
(74) *Attorney, Agent, or Firm*—Laurence A. Greenberg; Werner H. Stemer; Ralph E. Locher (57) ABSTRACT

The invention relates to a method and to a device for recognizing a collision, especially a side impact, for passenger protection means in a motor vehicle. The invention describes a method, especially in the case of side impact events, which differentiates between non-trigger situations and must-trigger situations by evaluating the frequency spectrum of the output signal (a) of an acceleration or pressure sensor as comprehensively as possible. The advantages of the invention are: robustness in relation to modifications in the signal amplitudes and the invention requires no previous knowledge of possible resonance frequencies. Another advantage of the invention is that no frequencies of the output signal (a) are blocked or suppressed.

17 Claims, 7 Drawing Sheets

METHOD AND DEVICE FOR RECOGNIZING A COLLISION

BACKGROUND OF THE INVENTION

Field of the Invention

The invention relates to a method and device for recognizing a collision, especially a side impact, for passenger protection means in a motor vehicle.

Conventional algorithms, especially for triggering lateral airbags, utilize, for example, higher proportions of frequencies of the output signal (a) of an acceleration or pressure sensor, albeit only to a limited extent. Terms like "Jerk" or "delta_a" principally examine an integral of the individual differences between two successive sampling values. This calculation supplies a reference value indicating whether higher frequencies are present in an amplitude which cannot be ignored, but does not provide information about the frequencies actually occurring or their distribution. Moreover, such criteria are strongly amplitude-dependent.

SUMMARY OF THE INVENTION

The object of the present invention is therefore to indicate an improved method and device for recognizing a collision, especially a side impact, for passenger protection means in a motor vehicle.

This object is achieved in the independent claims.

Advantageous embodiments and further developments, which can be used individually or in combination with one another, are indicated in the dependent claims.

The method according to the invention for recognizing a collision, especially a side impact, for passenger protection means in a motor vehicle is distinguished in that a signal interval of an output signal (a) of an acceleration or pressure sensor is continuously analyzed with regard to the frequencies contained therein.

The invention makes use here of the following physical reflections on the processes, especially in the case of a side impact. Various non-trigger situations, referred to as "misuse", such as, for example, a lateral impact of the vehicle against a curbstone, a hammer blow against the vehicle, the slamming of a door or suchlike generate in part output signals (a) with amplitudes similarly high to those of must-trigger situations. In contrast to these, however, they usually contain only one or two typical frequencies, which are determined by the vehicle design, which there would be vibrations of the chassis, vibrations in the vehicle, resonances of the fastening points of the sensor or similar. Must-trigger situations, especially for the lateral airbag, are characterized on the other hand by the intrusion of an object into the vehicle and thus by deformation of the lateral structure. This deformation leads, in the output signal (a) of the acceleration or pressure sensor, to a broad spectrum of many frequencies, caused by the deforming or breaking of structures of the vehicle. The distribution of frequencies in the output signal (a) of the acceleration or pressure sensor is now employed according to the invention as a feature for recognizing must-trigger situations.

To this end, the frequency spectrum contained in the signal interval is first divided up into a suitable number of frequency bands or ranges. Then, the signal energy present for each frequency band is determined. The partial signal energy is then set in relation to the total energy of the signal interval examined. Finally, the relative activations of the various frequency bands thus obtained are compared with, possibly fixed, predetermined threshold values (SW).

The signal energy of the respective frequency band can be determined, for example, with the aid of the Walsh transformation, as it is known, sometimes also called the Hadamard transformation. Here the individual values of the signal interval of the output signal are successively multiplied by various alternating sequences of "+1" and "−1" in the respective frequency of each frequency band and the results added up. Using the Walsh transformation advantageously reduces the calculational outlay compared with conventional frequency analyses substantially. Naturally, other appropriate transformations are also conceivable and are also covered.

In order to avoid rapid fluctuations in the evaluation, it is proposed in a further development of the invention that the relative activations of the various frequency bands be equalized before being compared with the predetermined threshold values (SW).

According to the invention, the number of threshold values (SW) exceeded is preferably deemed a coefficient for whether only a few frequencies are contained or whether the signal interval examined simultaneously contains a broad spectrum of many frequencies.

The coefficient can, where applicable through subtraction with a fixed or variable factor, preferably assume positive and negative values, for example from −3 to +4.

Alternatively or cumulatively, the coefficient is given a weighting by being, for example, multiplied by a scaling factor that is preferably freely adjustable.

According to the invention, the coefficient preferably influences a trigger threshold with which a trigger criterion for the passenger protection means is generally compared, the passenger protection means being released only when the trigger threshold is exceeded. The coefficient is now used in particular in order to make the trigger threshold for the airbag more sensitive (if the coefficient is high) or less sensitive (if the coefficient is low).

The invention also relates to a device for recognizing a collision, especially a side impact, for passenger protection means in a motor vehicle, comprising at least one means which continuously analyzes the output signal (a) of an acceleration or pressure sensor with regard to the frequencies contained therein according to the method described previously.

Insofar as the device is intended to serve in particular in providing a signal interval, it is proposed that a buffer of fixed length be provided in which the output signal (a) to be analyzed is stored intermediately such that the analysis at the current time always processes a signal interval of the output signal (a) from the most up-to-date or another suitable value to a defined period of time in the past.

Each new value is preferably stored in a buffer, especially a ring buffer as it is called, of fixed length, the oldest respective value of the output signal (a) being replaced by the most recent. The analysis advantageously uses the entire signal interval stored in the buffer.

Finally, it should be mentioned that an arrangement of acceleration or pressure sensors in or adjacent to a potential area of deformation in the motor vehicle, preferably in pairs at the height of each row of seats, has been tried and tested.

The present invention analyzes the output signal (a) of an acceleration or pressure sensor for frequencies within a certain range or signal interval of interest. It describes an improved method, especially in the case of side-impact events, which differentiates between non-trigger situations and must-trigger situations by evaluating the frequency spectrum of the output signal (a) as comprehensively as possible.

The advantages of the invention are: robustness in relation to modifications in the signal amplitudes, and the invention requires no previous knowledge or corresponding information store of possible resonance frequencies. Another advantage of the invention is that no frequencies of the output signal (a) are blocked or suppressed.

Further advantages of the invention and its further developments will be explained in detail below with reference to exemplary embodiments and to the drawings, in which:

DESCRIPTION OF THE PREFERRED EMBODIMENTS

Figure 1:
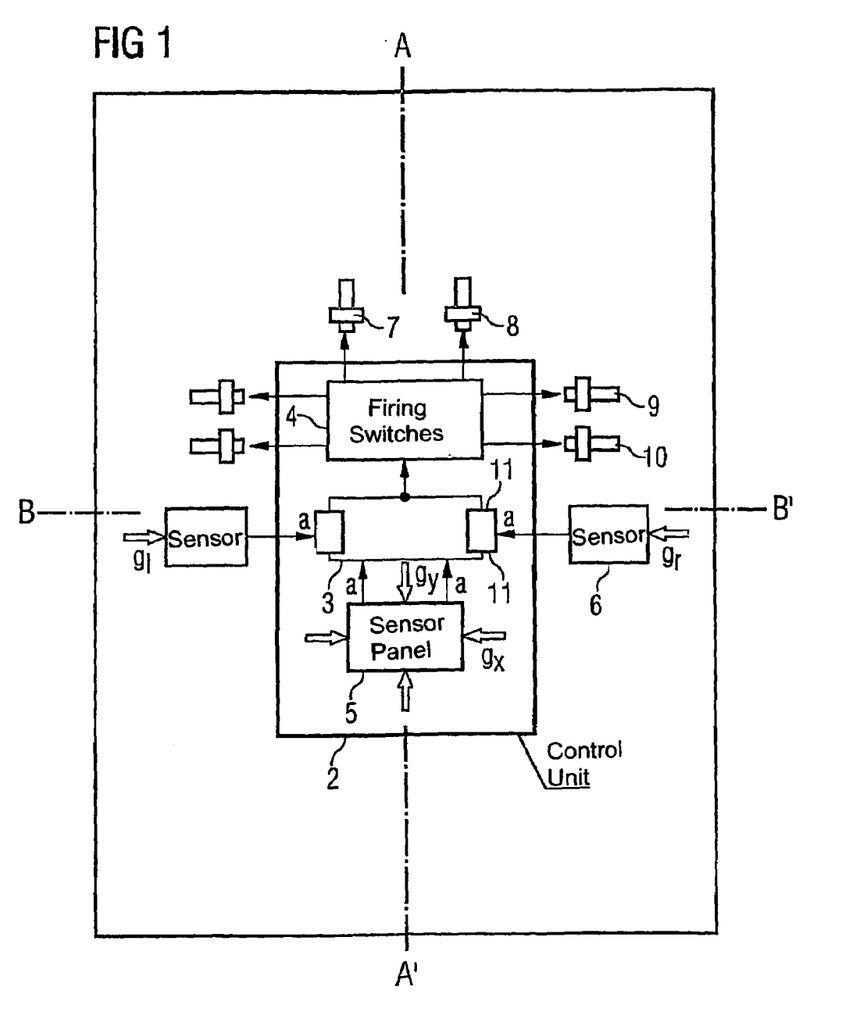
FIG. 1 shows schematically the typical structure of a passenger-protection system in a motor vehicle.

FIG. 1 shows the typical structure of a passenger-protection system in a motor vehicle 1. A control arrangement 2 is located at e.g. as central a point as possible in the motor vehicle 1. This control arrangement comprises an evaluation unit 3, for example in the form of at least one microcontroller. Located in the control arrangement 2 or adjacent to this control arrangement is a sensor panel 5 in which sensors (not shown) are purposefully arranged for measuring accelerations, e.g. an acceleration $g_x$ along a sensitivity axis in an x direction and $g_y$ along a sensitivity axis in a y direction. The sensitivity axes of the sensors span a plane which, after installation of the control arrangement 2 in a motor vehicle 1, is essentially parallel to a plane defined by the vehicle's longitudinal axis A-A' and the vehicle's transverse axis B-B'. Further sensors 6, especially for recognizing a side impact, are arranged laterally at a non-central point in the motor vehicle 1 for measuring lateral accelerations, e.g. an acceleration $g_r$ from the right and $g_l$ from the left, preferably therefore in or adjacent to a potential area of deformation during an accident, especially at a suitable location in or near to the vehicle doors, for example on the door sill of the driver's door or of the front passenger's door, at the foot of the B column or C column or on the wheel house or such like. Moreover, the sensors are preferably arranged in pairs, i.e. on the left and right respectively in the vehicle, in particular adjacent to each row of seats. Typically, acceleration sensors, but recently increasingly also pressure sensors, are used as sensors 6 for lateral installation. The respective output signals (a) of the sensors are scanned by the microcontroller 3, which then executes a crash-differentiation algorithm in order to differentiate between an actual collision, i.e. a must-trigger situation, and normal dynamic vehicle behavior or a typical non-trigger situation. The microcontroller 3 also carries out by means of a diagnostic system a continuous and/or cyclical diagnosis of the system in order to ensure that it is operating properly and is available in the event of an accident. The sensors arranged in the central sensor panel 5, like the sensors 6 arranged laterally, must also be extremely reliable so that they do not send any incorrect signals (a) to the microcontroller 3, which could lead to an unwanted activation of the restraining means. Every malfunction is therefore communicated to the driver e.g. through an airbag warning light on the instrument panel (not shown). If the airbags have to be deployed in the event of a collision, the microcontroller 3 activates a triggering current switch 4 so that current flows through the trigger circuits of the trigger for the driver's front airbag 7, the trigger for the passenger's front airbag 8 the trigger for the lateral airbag 9, the trigger for the belt tightener 10 or suchlike, by means of which the belt tighteners are activated and the gas-producing reaction inside the inflation modules is triggered.

The invention will be explained in detail below based on the example of the frequency analysis of the output signal (a) of an acceleration sensor 6 arranged laterally in the vehicle. Said output signal (a) is preferably first stored intermediately in a buffer 11. A so-called ring buffer would be suitable for use as a buffer 11. A ring buffer is a mechanism by means of which two (or more) processes can exchange data with one another. It has a freely determinable fixed size and is generally formed by a vector (array) of corresponding size. While a process, the writer, can write data to the buffer until the buffer is full, a reader can logically read only when there is data present in the buffer. Writer and reader each begin accessing the buffer at the same point. When the end of the buffer is reached, both write and read process begin again at the start of the buffer.

The preferred use, according to the invention, of a buffer 11 serves primarily in providing an interval of the signal (a). Sampling values of the output signal (a) to be analyzed can be stored intermediately by means of the buffer 11 such that at the current time a signal interval of the output signal (a) is always analyzed for frequencies contained therein from the most up-to-date value or another suitable value to a defined period in the past.

The analysis itself begins first with the dividing up of the frequency spectrum contained in the signal interval into a suitable number of frequency bands or ranges. If each signal interval comprises, for example, sixteen acceleration values (corresponds in the example given below to 8 ms), then a maximum of sixteen bands can be calculated, not all of which, however, have to be of interest, especially if the output signal (a) passes in advance through a bandpass filter, e.g. a $4^{th}$ order filter, so that at typical frequencies greater than 600 Hz or 800 Hz the signal (a) is strongly attenuated and an analysis for signal ranges exhibiting such limited deflection serves little purpose.

The signal energy present for each frequency band is then determined. This signal energy is defined as the energy which a certain frequency proportion takes up in the overall signal. The signal energy of the respective frequency band is preferably determined with the aid of the so-called Walsh transformation. Here the individual values of the signal interval of the output signal are successively multiplied by various alternating sequences of "+1" and "−1" in the respective frequency of each frequency band and the results later added up.

Figure 2A:
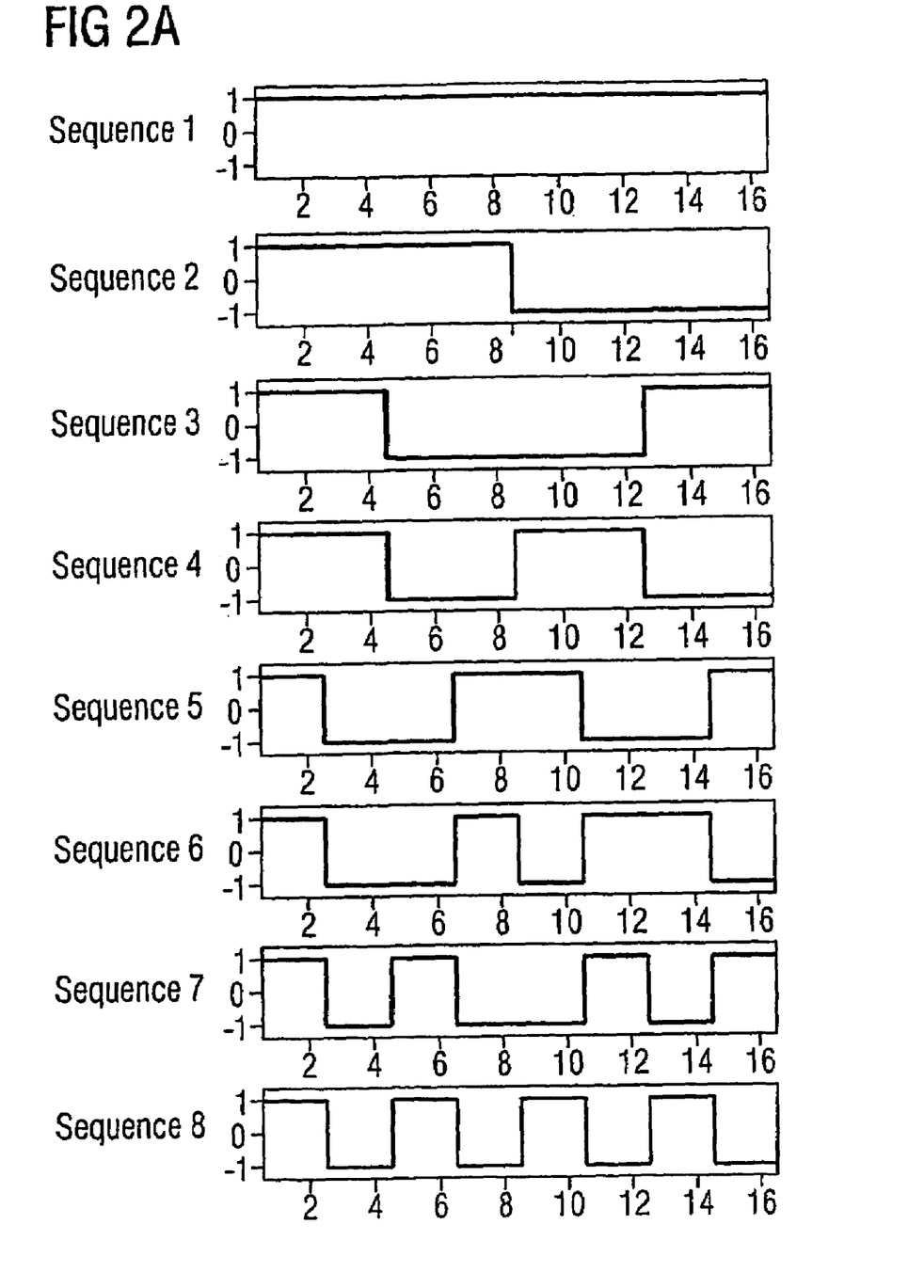
FIG. 2 shows schematically the typical sequences of the Walsh transformation.
Figure 2B:
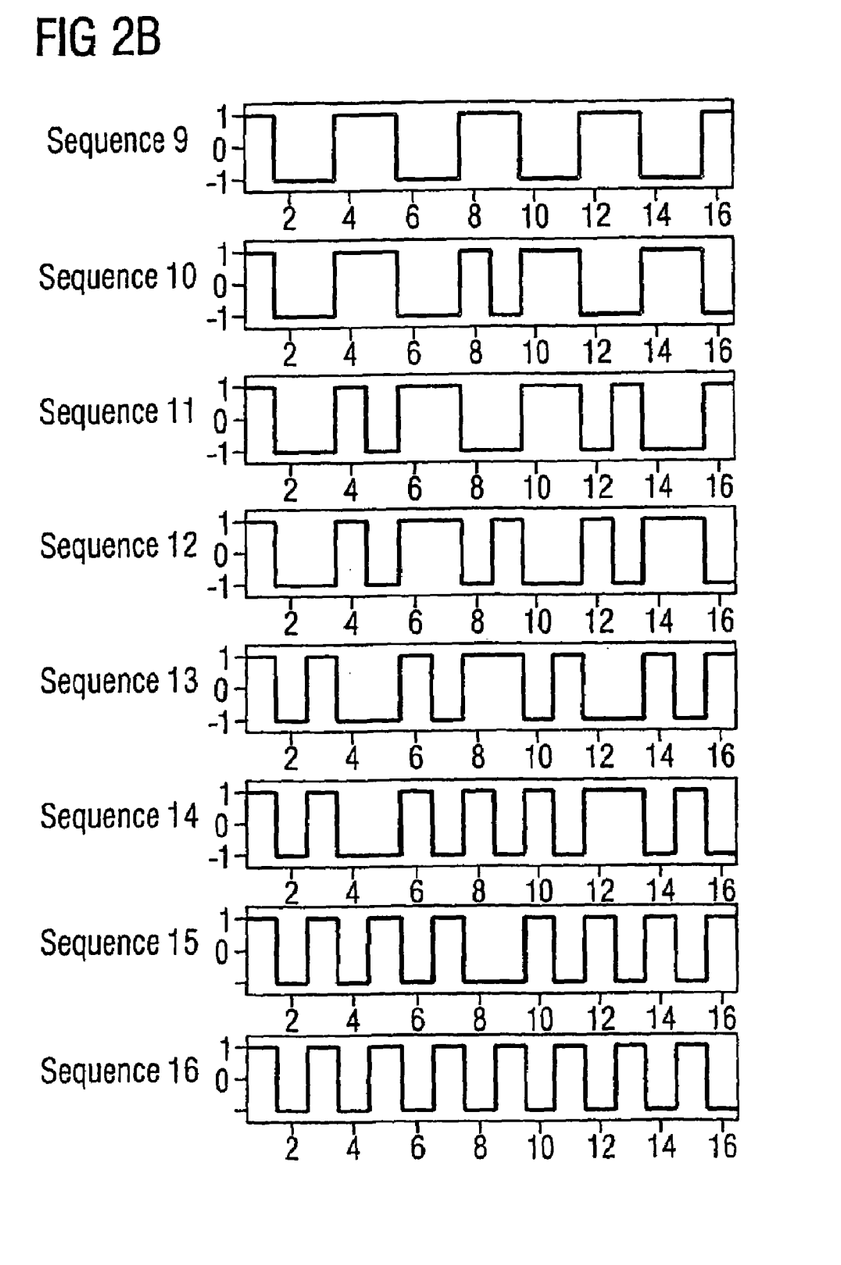
Figure 3A:
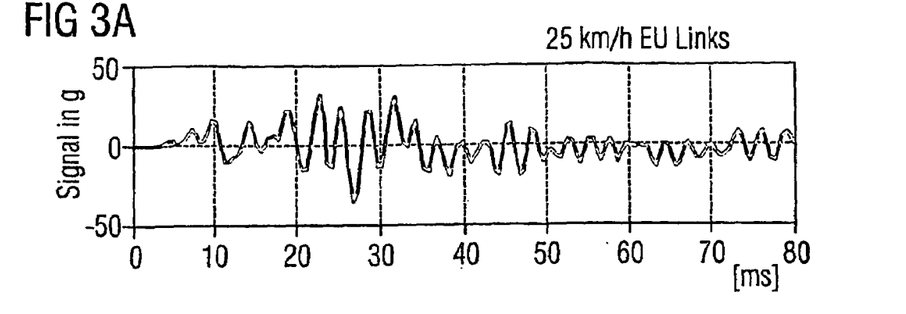
FIG. 3 shows schematically a first example of a frequency analysis in the case of a must-trigger situation.
Figure 3B:
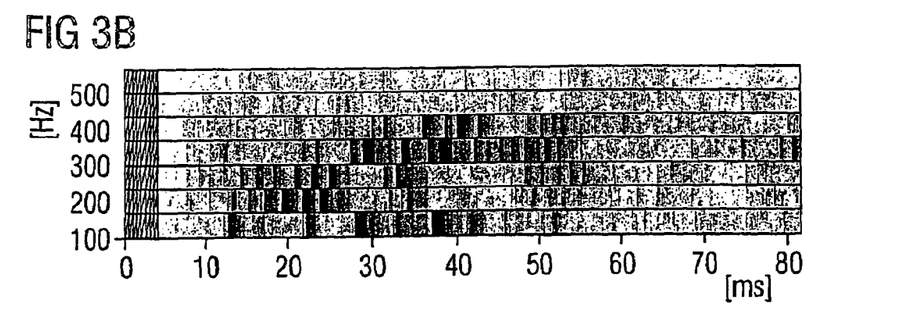
Figure 3C:
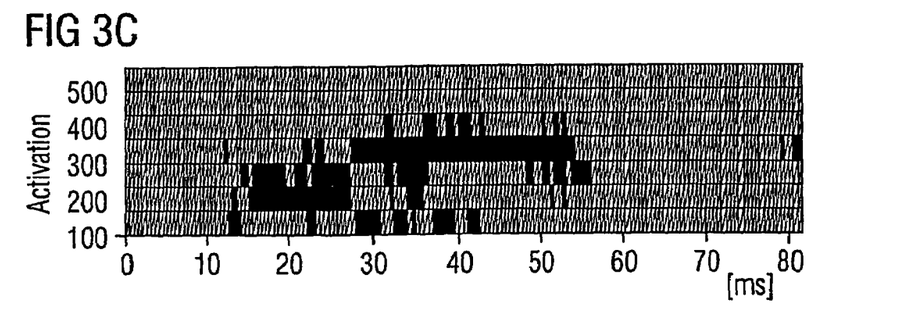
Figure 3D:
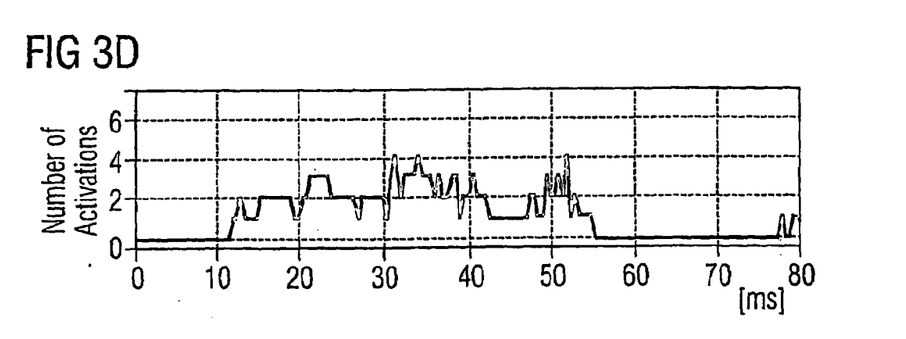
Figure 4A:
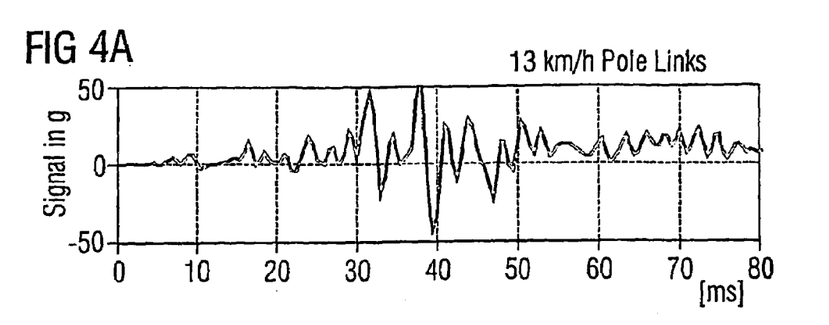
FIG. 4 shows schematically a second example of a frequency analysis in the case of a must-trigger situation.
Figure 4B:
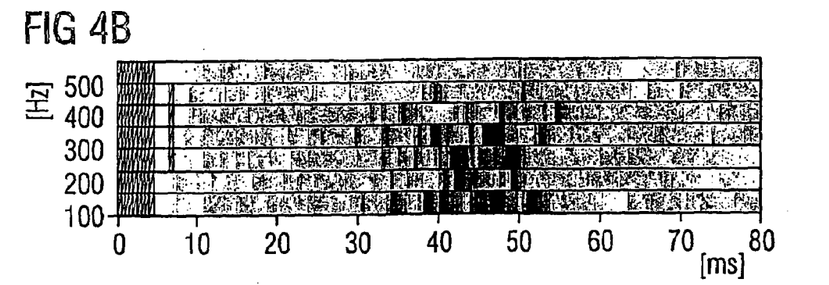
Figure 4C:
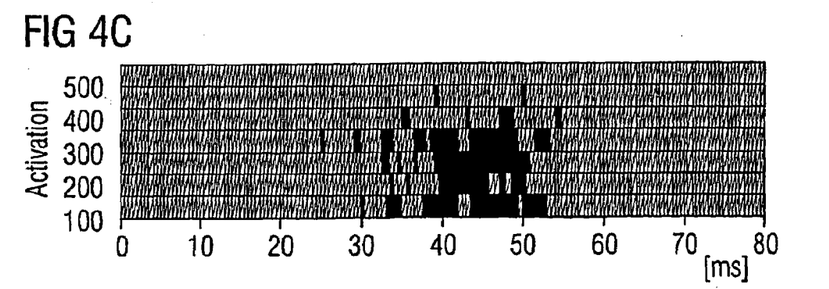
Figure 4D:
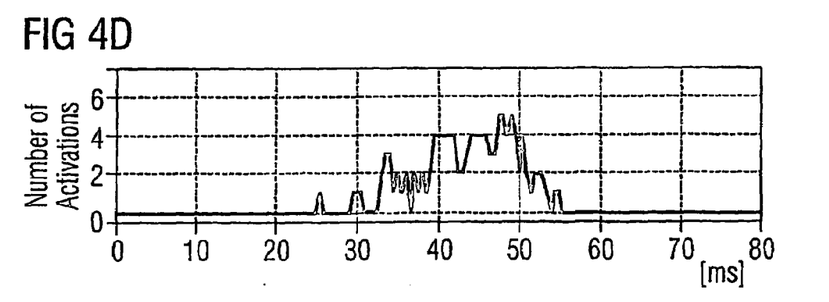
Figure 5A:
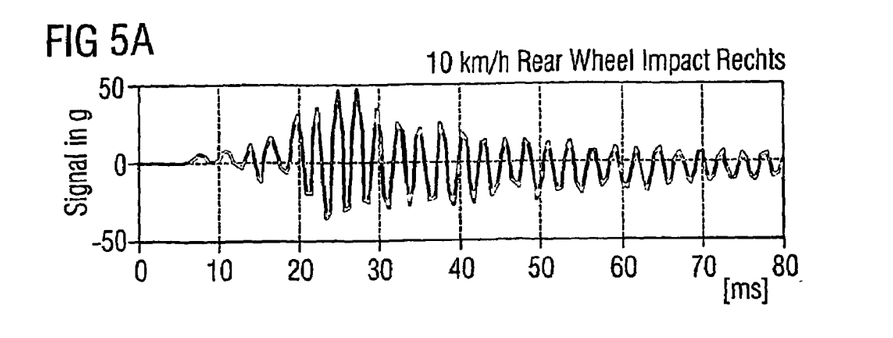
FIG. 5 shows schematically a first example of a frequency analysis in the case of a non-trigger situation.
Figure 5B:
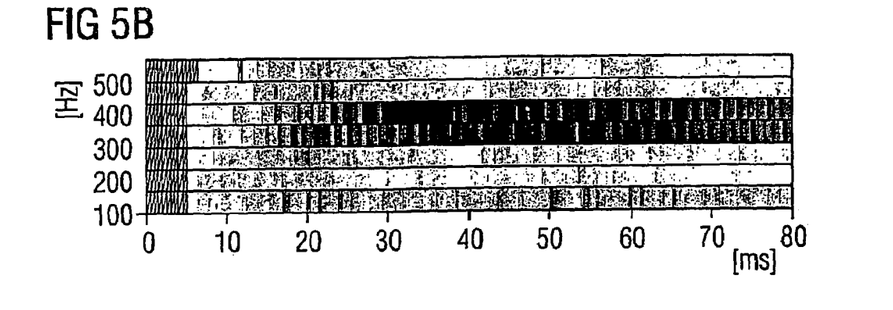
Figure 5C:
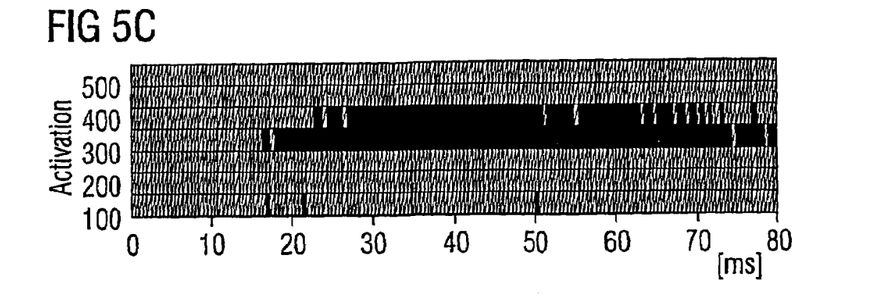
Figure 5D:
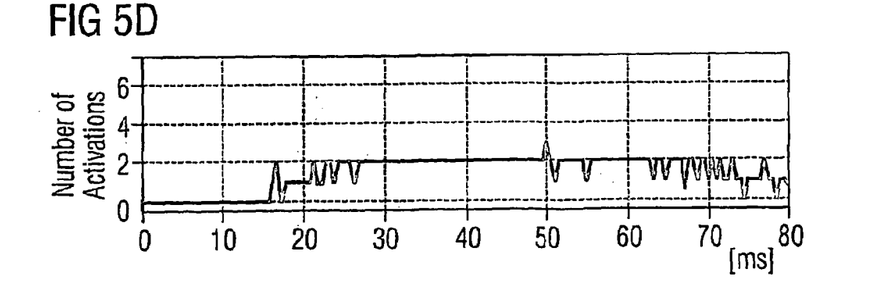
Figure 6A:
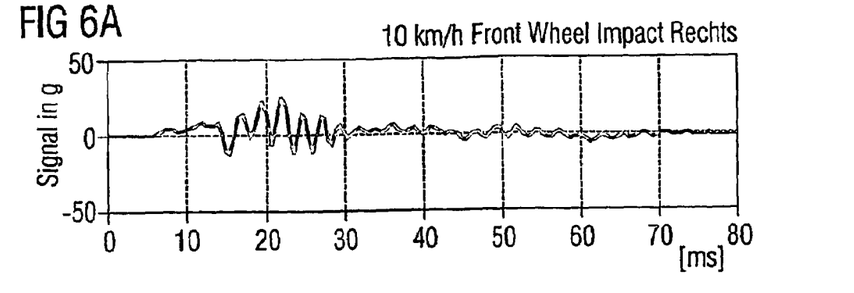
FIG. 6 shows schematically a second example of a frequency analysis in the case of a non-trigger situation.
Figure 6B:
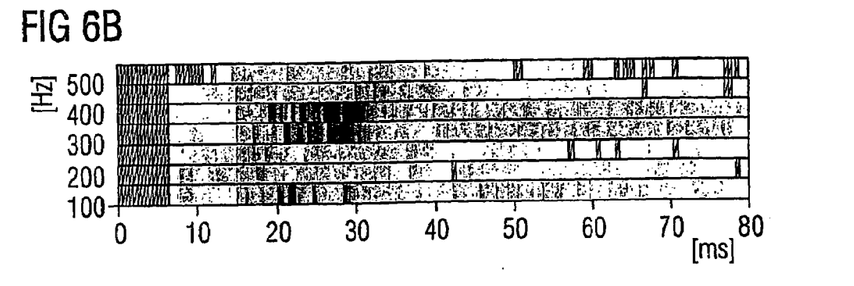
Figure 6C:
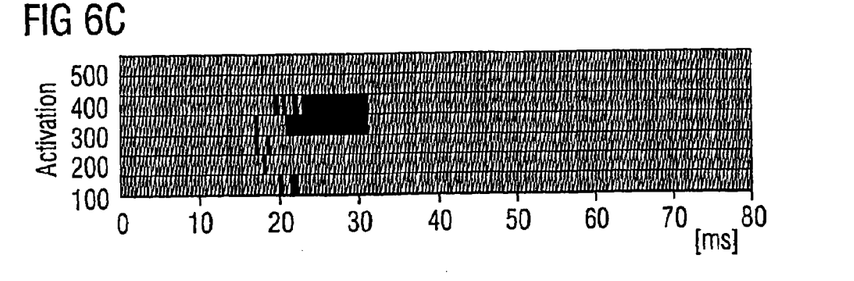
Figure 6D:
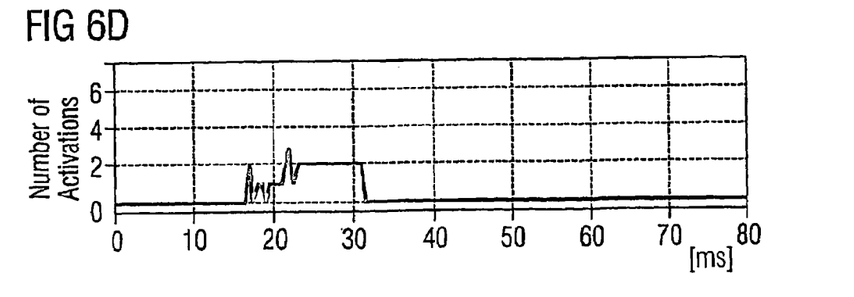

FIG. 2 shows the typical sequences of a Walsh transformation. The Walsh transformation is structured analogously to the Fourier transformation, the role of the trigonometric functions being assumed by the Walsh functions. Walsh functions are very simple, so-called step functions, that is piecemeal constant functions. They assume only the two functional values "+1" and "−1". These two functional values correspond to two states, so that Walsh functions can be implemented particularly easily in a computer, for example in the microcontroller 3. The full orthogonal system of Walsh functions has many properties in common with the trigonometric functions. Just as the finite Fourier analysis and the discrete Fourier transformation were developed on the basis of sine and cosine functions, there is also a finite and discrete Walsh transformation for the system of Walsh functions.

This so-called partial signal energy is then set in relation to the total energy of the signal interval examined. The total energy can be obtained, for example, by adding up the sums of the individual acceleration values in the signal interval examined.

Finally, the relative activations of the various frequency bands thus obtained are, where applicable, equalized in order to average any phase delay and compared with predetermined threshold values (SW), a separate threshold value (SW) preferably being provided for each frequency band.

The number of threshold values (SW) exceeded is now deemed to be a coefficient for whether only a few frequencies are contained, as typically in non-trigger situations, or whether the signal interval examined simultaneously contains a broad spectrum of many frequencies, which is characteristic for a must-trigger situation. The distribution of the frequencies in the output signal (a) of the sensor is according to the invention now used as a feature for recognizing must-trigger situations.

FIGS. 3 to 6 show examples of a frequency analysis in the case of must-trigger and non-trigger situations. The data in the buffer 11 was sampled by the microcontroller 3 of the control arrangement 2 of a motor vehicle 1, for example at a sample rate of SR=2 kHz. The sequences shown in FIG. 2 insofar represent frequency bands between 0 Hz (sequence 1) and SR/2=1 kHz (sequence 16). Sequence 3, for example, represents a frequency band of 133 Hz, sequence 6 a frequency band of 333 Hz; sequence 8 a frequency band of 500 Hz and sequence 9 a frequency band of 533 Hz. Only frequency ranges that were appropriate to the analysis were scanned, namely seven frequency bands for the sequences 3 to 9. The lower ranges (sequence 2 and 1) provided no indication of a crash due to their slow movement or lack of oscillation; the high frequencies were of limited informative value due to the signal attenuation which was mentioned previously.

FIG. 3 shows a first example of a frequency analysis in the case of a must-trigger situation. FIG. 3a shows the acceleration signal g during a test of the type "25 EU L", i.e. during the impact of a so-called Europe barrier against the left-hand side of a motor vehicle at 25 km/h. FIG. 3b shows as a grey-scale image the frequency spectrum Hz contained in the signal interval, divided up into seven frequency bands. The lowest frequency band corresponds to sequence 3 in FIG. 2, the highest frequency band to sequence 9. The darker the grey level, the more active, i.e. the more energy-rich relative to the total energy is a certain frequency in the signal. This so-called relative activation of the various frequency bands can now be compared with a predetermined threshold value. FIG. 3c shows the values lying above the respective threshold, the so-called activation; FIG. 3d the sum of the results (number of activations) which according to the exemplary embodiment can assume eight values, namely from 0 to +7. In order to allow a trigger threshold to become more sensitive where the results or coefficients are high or to allow the trigger threshold with which a trigger criterion for the passenger protection means is commonly compared to become less sensitive where the coefficient is low, the obvious thing to do is to allow the coefficient range to assume not just positive but also negative values. This is achieved according to the invention preferably by means of subtraction with a possibly fixed factor, for example three, so that the range of values then extends from −3 to +4; a low coefficient thus preferably has a negative sign and a high coefficient a positive sign. In order to be able adequately to influence trigger thresholds with three- or four-digit word sizes, it is proposed that the coefficient be multiplied by a preferably freely adjustable, for example two- or three-digit, scaling factor.

FIG. 4 shows a second example of a frequency analysis in the case of a typical must-trigger situation. FIG. 4a shows the acceleration signal g during a test of the type "13 Pole L", i.e. during the left-hand-side collision of a motor vehicle against a pole at 13 km/h. FIG. 4b shows the grey-scale image of the frequency spectrum contained in the signal interval, divided up into frequency bands. FIG. 4c shows the values lying above the respective threshold; FIG. 4d the sum of the results.

FIG. 5 shows a first example of a frequency analysis in the case of a typical non-trigger situation. FIG. 5a shows the acceleration signal g during a test of the type "Rear Wheel Impact R", i.e. during the impact of the rear right tire of a motor vehicle, for example, against a curbstone at 10 km/h. FIG. 5b shows the associated grey-scale image of the frequency spectrum contained in the signal interval, divided up into seven frequency bands. FIG. 5c shows the values lying above the respective threshold; FIG. 5d the sum of the results.

FIG. 6 shows a second example of a frequency analysis in the case of a typical non-trigger situation. FIG. 6a shows the acceleration signal g during a test of the type "Front Wheel Impact R", i.e. during the impact of the front right tire of a motor vehicle, for example, against a curbstone at 10 km/h. FIG. 6b shows the associated grey-scale image of the frequency spectrum contained in the signal interval, divided up into seven frequency bands. FIG. 6c shows the values lying above the respective threshold; FIG. 6d the sum of the results.

In contrast to the must-trigger situations shown in FIGS. 3 and 4, the non-trigger situations according to FIGS. 5 and 6 usually contain only one or two typical frequencies, which are determined by the vehicle design, which there would be vibrations of the chassis, vibrations in the vehicle, resonances of the fastening points of the sensor or similar. Must-trigger situations, especially in respect of the lateral airbag, are characterized on the other hand by the intrusion of an object into the vehicle and thus by the deformation of the lateral structure. This deformation leads, in the output signal (a) of the acceleration or pressure sensor, to a broad spectrum of many frequencies, caused by the deforming or breaking of structures of the vehicle.

The present invention analyses the output signal (a) of an acceleration or pressure sensor for frequencies within a defined range or signal interval that is of interest. It describes an improved method, especially in the case of side-impact events, for distinguishing between non-trigger situations and must-trigger situations by evaluating the frequency spectrum of the output signal (a) as comprehensively as possible.

The advantages of the invention are: robustness in relation to modifications in the signal amplitudes, and the invention requires no previous knowledge or corresponding information store of possible resonance frequencies. Another advantage of the invention is that no frequencies of the output signal (a) are blocked or suppressed.

The present invention is therefore especially suitable for passenger protection systems in a modern motor vehicle.

I claim:

1. A method for recognizing a collision for a passenger protection system in a motor vehicle, the method which comprises:
   continuously analyzing a signal interval of an output signal of an acceleration or pressure sensor is with regard to frequencies contained therein;
   first, dividing a frequency spectrum contained in the signal interval into a suitable number of frequency bands;
   determining a partial signal energy present for each frequency band;
   finding a relationship between the partial signal energy and a total energy of the signal interval being analyzed;
   comparing relative activations of the various frequency bands thus obtained with predetermined threshold values (SW); and
   determining whether or not a collision has occurred based on the comparison.

2. The method according to claim 1, which comprises monitoring the motor vehicle for a side impact collision.

3. The method according to claim 1, which comprises, for determining the signal energy of the respective frequency band, successively multiplying individual values of the signal interval by various alternating sequences of "+1" and "−1" in a respective frequency of each frequency band, and adding the multiplication results.

4. The method according to claim 1, which comprises equalizing the relative activations of the various frequency bands prior to comparing the relative activations with the predetermined threshold values (SW).

5. The method according to claim 1, which comprises considering a number of threshold values (SW) exceeded as a coefficient for whether the signal interval being examined contains a small number of frequencies or the signal interval being examined contains a broad spectrum of a large number of frequencies.

6. The method according to claim 5, which comprises allowing the coefficient, optionally by subtraction of a factor, to assume positive and negative values.

7. The method according to claim 5, which comprises allowing the coefficient, optionally by subtraction of a factor, to assume a value between −3 and +4.

8. The method according to claim 5, which comprises weighting the coefficient.

9. The method according to claim 8, which comprises weighting the coefficient multiplying with a freely adjustable scaling factor.

10. The method according to claim 5, which comprises using the coefficient to influences a trigger threshold for comparison with a trigger criterion for the passenger protection system, and releasing the passenger protection system only when the trigger threshold is exceeded.

11. The method according to claim 7, which comprises rendering the trigger threshold more sensitive when the coefficient is higher and rendering the trigger threshold less sensitive when the coefficient is lower.

12. In a passenger protection system for a motor vehicle, a device for recognizing a collision, comprising: means for continuously analyzing an output signal of an acceleration or pressure sensor with regard to the frequencies contained therein and means for carrying out the method according to claim 1.

13. The device according to claim 12, configured for detecting a side impact.

14. The device according to claim 12, which comprises a buffer of fixed length for intermediately storing the output signal to be analyzed such that the analysis at a current time always processes a signal interval of the output signal from a most recent or another suitable value to a defined period in the past.

15. The device according to claim 12, which comprises a buffer of fixed length configured for first-in-first-out processing, with an oldest respective value of the output signal being replaced with a most up-to-date value.

16. The device according to claim 12, wherein an acceleration or pressure sensor is disposed in or adjacent a potential deformation area in the motor vehicle.

17. The device according to claim 16, wherein the acceleration or pressure sensor is a pair of sensors disposed at a height level of each row of seats in the motor vehicle.

* * * * *